United States Patent [19]

Fou

[11] Patent Number: 5,499,197
[45] Date of Patent: Mar. 12, 1996

[54] INTELLIGENT AND ALL-BEARING CONTROL CIRCUIT DEVICE OF REVERSE OSMOSIS DRINKING WATER MACHINE

[76] Inventor: Hsu-Chao Fou, No. 109, Tunnel 316, Dah Shuenn 3 Road, Kaohsiung, Taiwan

[21] Appl. No.: 222,996

[22] Filed: Apr. 5, 1994

[51] Int. Cl.⁶ ........................................... G06F 19/00
[52] U.S. Cl. ........................ 364/550; 210/143; 210/739; 210/743; 364/509
[58] Field of Search .................. 137/3; 210/89, 210/143, 739, 743; 364/500, 501, 502, 509, 550

[56] References Cited

U.S. PATENT DOCUMENTS

| | | | |
|---|---|---|---|
| 1,910,011 | 5/1933 | Griswold et al. | 210/89 |
| 1,931,968 | 10/1933 | Sweeney et al. | 210/143 X |
| 2,065,962 | 12/1936 | Bowers | 210/89 |
| 2,204,225 | 6/1940 | Merckel | 210/143 X |
| 2,240,171 | 4/1941 | Brice et al. | 210/89 |
| 2,251,149 | 7/1941 | Merckel | 137/3 X |
| 2,292,801 | 8/1942 | Slidell | 210/143 X |
| 2,359,991 | 10/1944 | Hinsch | 210/89 X |
| 2,363,167 | 11/1944 | Daniels | 210/89 |
| 2,526,515 | 10/1950 | Stein | 137/3 |
| 2,689,218 | 9/1954 | Waugh | 210/89 |
| 3,079,079 | 2/1963 | Phister, Jr. et al. | 364/502 |
| 3,154,670 | 10/1964 | Gossel | 364/502 X |
| 3,163,173 | 12/1964 | Kuntz | 364/502 X |
| 3,164,550 | 1/1965 | Lamkin | 210/89 |
| 3,219,046 | 11/1965 | Waugh | 364/502 X |
| 3,275,988 | 9/1966 | Yetter | 364/500 X |
| 3,294,648 | 12/1966 | Luppfer et al. | 364/501 X |
| 3,415,720 | 12/1968 | Rijnsdorp et al. | 364/501 X |
| 3,428,528 | 2/1969 | Oglesby, Jr. et al. | 364/501 X |
| 3,447,906 | 6/1969 | Zimmerli | 364/500 X |
| 3,578,005 | 5/1971 | Jurion et al. | 137/3 |
| 4,547,286 | 10/1985 | Hsiung | 210/738 |
| 4,918,426 | 4/1990 | Butts et al. | 210/89 X |
| 5,173,190 | 12/1992 | Picek | 210/651 |
| 5,389,254 | 2/1995 | Sherman | 210/89 X |

*Primary Examiner*—Edward R. Cosimano
*Attorney, Agent, or Firm*—Raymond Y. C. Chan

[57] ABSTRACT

A control circuit device of a reverse osmosis drinking water machine has a microcomputer unit controlling the working of various peripheral circuits and enabling the drinking water machine to determine the quality of the drinking water and to clean automatically the filtration elements of the basis of the determined quality of the drinking water. The device is further provided with an output unit capable of giving an advance warning to remind the user of the need of replacing the worn-out filtration elements. The output unit is also capable of terminating automatically the water-making process when the PPM value of the drinking water so made is not in conformity with the health standard.

10 Claims, 6 Drawing Sheets

INTELLIGENT AND ALL-BEARING CONTROL CIRCUIT DEVICE OF REVERSE OSMOSIS DRINKING WATER MACHINE

BACKGROUND OF THE PRESENT INVENTION

The present invention relates generally to a drinking water machine, and more particularly to a reverse osmosis drinking water machine which is provided with an intelligent and all-bearing control circuit device for enabling and monitoring the drinking water machine to make the drinking water having the quality of purity in conformity with the standards of pubic health.

The main culprits of the water pollution today include industrial wastes, household wastes, farm pesticides, and the animal wastes produced by hog and poultry farms. As the pollution problems of the source of our drinking water, such as the rivers, have become increasingly worrisome, people tend to have very little confidence in the quality of their drinking water provided by the water company. In addition, people's anxiety over the quality of their drinking water is further aggravated by the fact that the conditions of the water-supplying pipes and reservoirs are often found to be unsatisfactory. As a result, a variety of water-treating devices, such as water filtering devices, water purifying devices, water softening devices, etc., have become ubiquitous in places like offices, homes, factories, schools, churches, and so forth. In general, such conventional water-treating devices as mentioned above are provided with one or more additional filtration means for enhancing the purity of the drinking water. The conventional drinking water machines are in fact effective in upgrading the quality of the drinking water. Nevertheless, the conventional drinking water machines are defective in design. The shortcomings inherent in the conventional drinking water machines are described explicitly hereinafter.

The conventional drinking water machine hasn't provided any PPM (parts per million) device for monitoring the quality of the drinking water so produced. It is therefore questionable that the drinking water made by the conventional drinking water machines is really safe to drink. Without the reliable scientific data indicating that the drinking water produced by the conventional drinking water machines is excellent in purity, people's anxiety over the quality of their drinking water is not going to dissipate easily.

Some of the conventional drinking water machines are provided with the RO (reverse osmosis) filtration element, which is so arranged as to form a parallel tangent plane with the flowing direction of the water. As the water is forced under pressure against the RO filtration element by means of a manually operated switch valve which is intended to increase the speed and the flow of the water passing through the RO filtration element, some of the water can be caused to pass through the RO filtration element in a vertical angle instead of a parallel manner, so as to filter out salts and other impurities. The filtration element must be washed and cleaned periodically in accordance with the schedules specified by the manufacturer of the drinking water machine. In order to prolong the service life span of the drinking water machine, the impurities deposited in the RO filtration element must be removed so as to prevent them from becoming hardened to clog the RO filtration element of the drinking water machine. It happens from time to time that the cleaning schedules of the RO filtration element of the drinking water machine are unintentionally disregarded or overlooked. Furthermore, the chore of cleaning the RO filtration element is not the task that people enjoy to do. It is an irresistible trend of the modern age that the consumers prefer an automated appliance to a manually operated appliance.

The RO filtration element of the conventional drinking water machine mentioned above is capable of filtering out the impurities, such as the unwanted suspended particles, the chlorine molecules, the pesticides, various organic matters, heavy metals, and the organic compound such as chloroform which is a carcinogen. In addition, the RO filtration element is capable of deodorizing the water. If such impurities as mentioned above are allowed to accumulate in the RO filtration element, the filtering effect of the RO filtration element will be seriously undermined to an extent that bacteria and fungi can grow and flourish on the accumulated impurities, thereby a potential health hazard is brought about to the users of the water drinking machine. Moreover, if the water drinking machine is used less often, the service life span of the RO filtration element of the water drinking machine is prolonged accordingly. Therefore, the scheduled maintenance work of the water drinking machine is likely to be delayed or even skipped. The quality of operating performance of the drinking water machine is often compromised by the lack of the routine maintenance work of the water drinking machine.

The conventional drinking water machine has not provided with a warning system which senses to keep the user of the machine to be on the alert for any indication that the drinking water machine is no longer working properly to make the drinking water which is safe to drink.

SUMMARY OF THE PRESENT INVENTION

It is, therefore, the primary objective of the present invention to provide an intelligent and all-bearing control circuit device of RO drinking water machine, capable of monitoring automatically the quality of the drinking water made by the RO drinking water cleaning of the filtration element of the RO drinking water machine.

It is still another objective of the present invention to provide an intelligent and all-bearing control circuit device of RO drinking water machine, capable of monitoring automatically the functional integrity of the filtration element and of displaying automatically an advance information on the timing of replacing the disabling filtration element, so as to ensure that the RO drinking water machine makes the drinking water of the highest quality every time.

It is still another objective of the present invention to provide an intelligent and all-bearing control circuit device of RO drinking water machine, capable of causing automatically the RO drinking water machine to cease making the drinking water at such time when the PPM (parts per million) value of the drinking water and the service life of the RO drinking water machine are not in conformity with the specified safety standards, so as to ensure that the RO drinking water machine makes the drinking water of the highest quality every time.

It is still another objective of the present invention to provide an intelligent and all-bearing control circuit device of RO drinking water machine, capable of monitoring and displaying automatically the information on the working status of every portion of the RO drinking water machine, so as to keep the user of the RO drinking water machine be informed of the current status of the use of the RO drinking water machine.

It is still another objective of the present invention to provide an intelligent and all-bearing control circuit device of RO drinking water machine, capable of working as an AM-FM radio for the listening pleasure of the user of the RO drinking water machine.

It is still another objective of the present invention to provide an intelligent and all-bearing control circuit device of RO drinking water machine, which may be used for monitoring the water mixing ratio of the sewage treatment, for testing an electroplating gauge of a chemical tank, a straining pool, etc..

The foregoing objectives and device of the present invention can be more readily understood by studying the following detailed description of the present invention in accordance with the drawings provided herewith.

DETAILED DESCRIPTION OF THE PREFERRED EMBODIMENT

Figure 1:
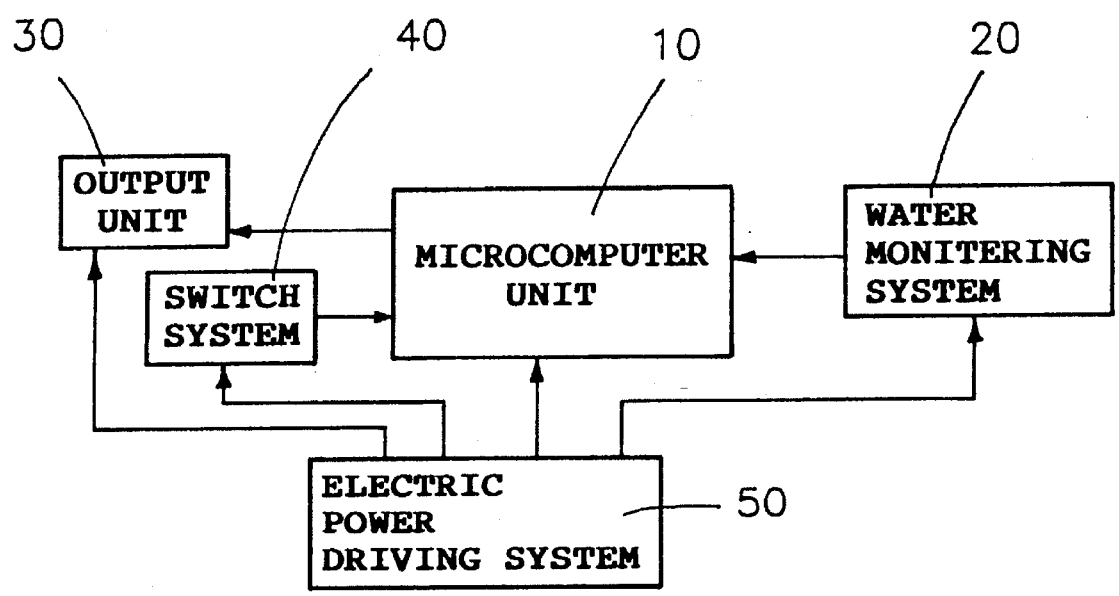
FIG. 1 shows a block diagram of an intelligent and all-bearing control circuit device of a reverse osmosis drinking water machine of the present invention.

As shown in FIG. 1, an intelligent and all-bearing control circuit device of a RO drinking water machine of the present invention comprises a microcomputer unit 10, a water monitoring system 20, an output unit 30, a switch system 40, and an electric power driving system 50.

The microcomputer unit 10 has an output end connected with an input end of the output unit 30 and has an input end connected respectively with an output end of the water monitoring system 20 and with an output end of the switch system 40. The microcomputer unit 10 is used in processing the signals transmitted thereto from the various peripheral systems of the present invention.

The water monitoring system 20 sends out a signal to the microcomputer unit 10 via its output end which is connected with the input end of the microcomputer unit 10. The water monitoring system 20 is used in measuring the water quality signal.

Figure 4:
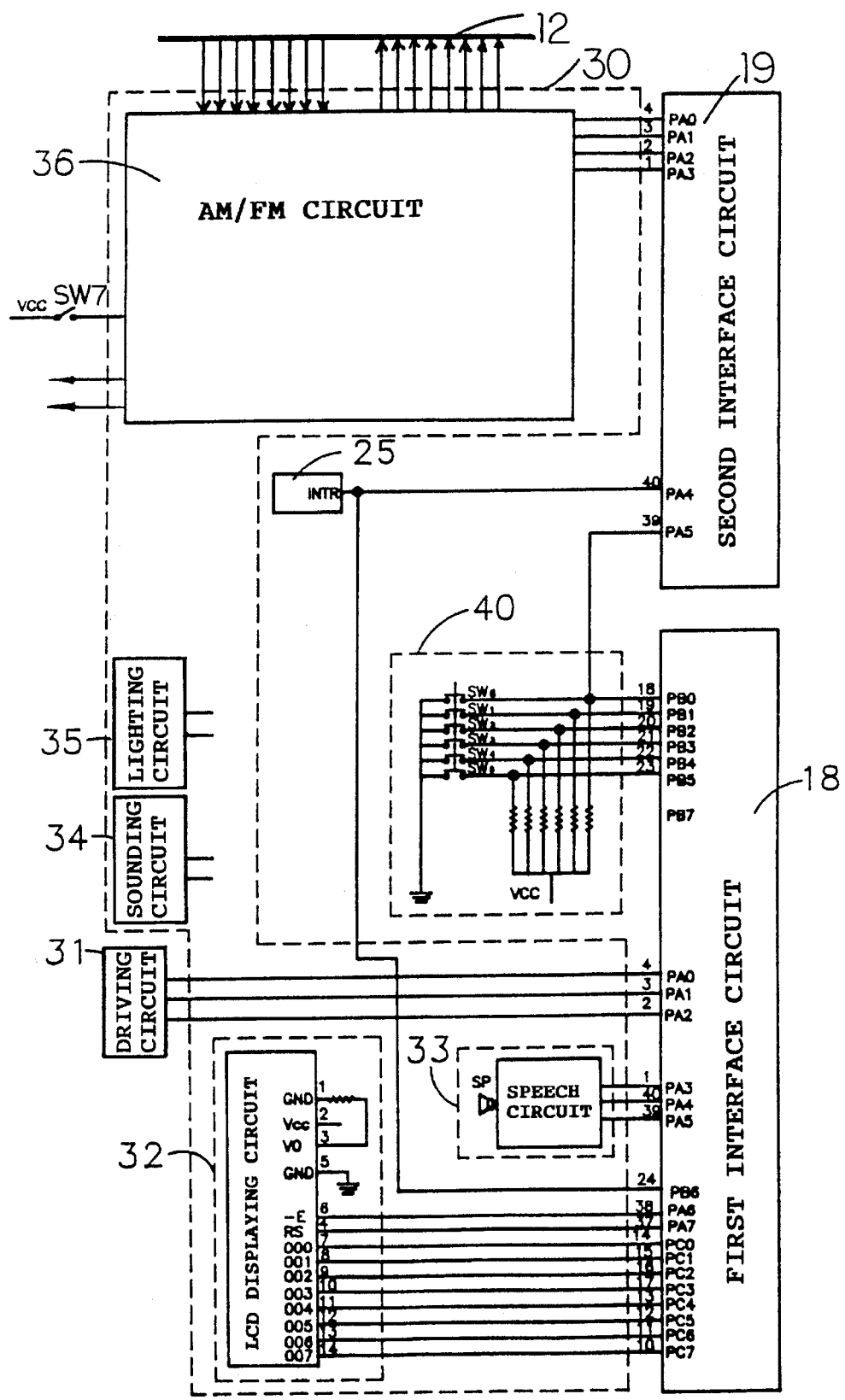
FIG. 4 shows a detailed circuit diagram of an output unit and a switch system of the present invention.

The output unit 30 is connected at the input end thereof with the output end of the microcomputer unit 10. The output unit 30, comprising a driving circuit 31, an LCD displacing circuit 32, a speech circuit 33 and an AM/FM circuit 36 (as shown in FIG. 4), is used in displaying an instruction sent by the microcomputer unit 10 in which the signals from the water monitoring system 20 and the switch system 40 are processed.

The switch system 40 is connected at the output end thereof with the input end of the microcomputer unit 10. The switch system 40 is used in the data searching and the data setting up.

The electric power driving system 50 serves as a source for providing the entire control circuit device of the present invention with an operating power.

Please referring to FIG. 2 and 3, the microcomputer unit 10 of the present invention is shown to comprise various component parts, which are described hereinafter.

A central processing unit 11 has data pins D0–D7 parallel to one another and connected with a data bus 12 and further has address pins A0–A15 parallel to one another and connected with an address bus 13. The data reading pins RD of the central processing unit 11 are connected respectively with the pins OE of a random access memory 15 and an erasable programmable read only memory 16, the pin I4 of a bolted lock decoder 17, and the pins RD of a first interface circuit 18, a second interface circuit 19 and an analog-digital converter 25 of the water monitoring system 20 (as shown in FIG. 3). The data writing pins WR of the central processing unit 11 are connected respectively with the pin WE of the random access memory 15, the pin I3 of the bored lick decoder 17, and the pins WR of the first interface circuit 18, the second interface circuit 19 and the analog-digital converter 25 (as shown in FIG. 3). The central processing unit 11 serves as a control center of the entire control circuit device of the present invention. In other words, the central processing unit 11 controls an overall activity in connection with the access of data relating to the PPM value, the value of the volume of drinking water made so far, the service life, and the time, etc.

Figure 3:
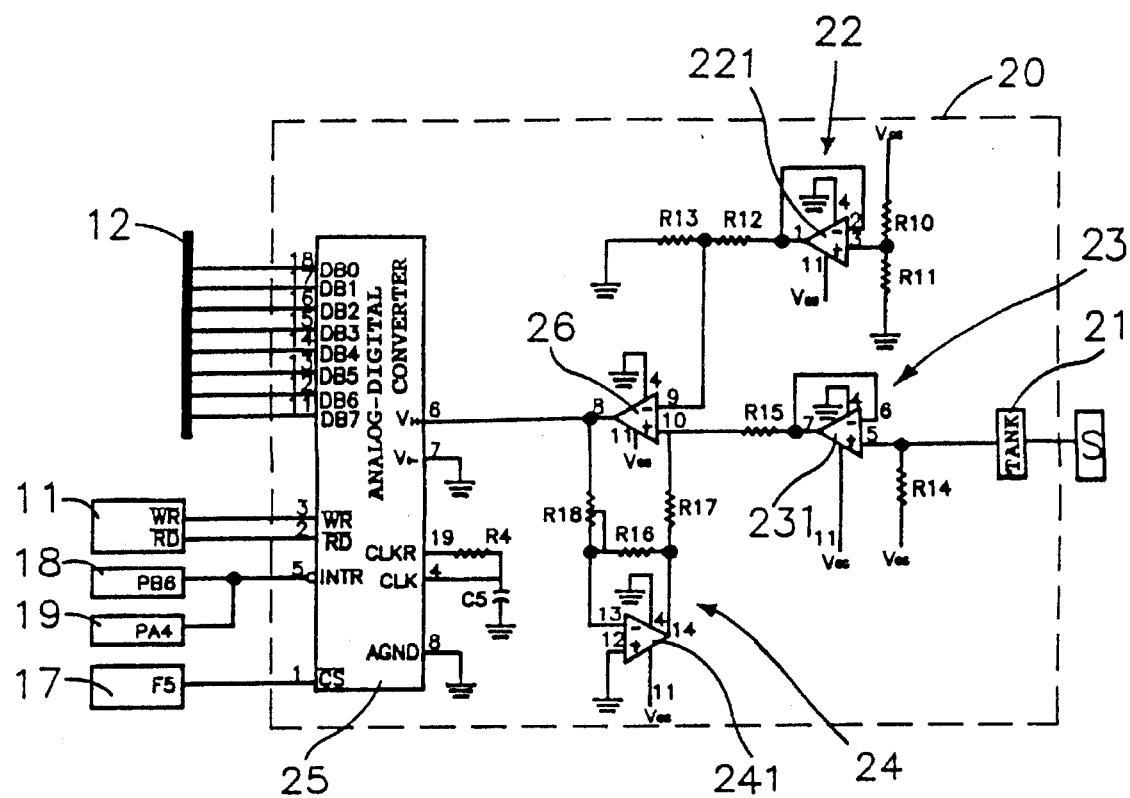
FIG. 3 shows a detailed circuit diagram of a water monitoring system of the present invention.

The data bus 12 is a conductor serving as a common connection of the data pins of the central processing unit 11, a time clock IC 14, the random access memory 15, the erasable programmable read only memory 16, the first interface circuit 18, the second interface circuit 19, and the analog-digital converter 25 of the water monitoring system 20 (as shown in FIG. 3).

The address bus 13 is a conductor serving as a common connection of the address pins of the central processing unit 11, the random access memory 15 and the erasable programmable read only memory 16.

The time clock IC 14 has address and data pins AD0–AD7 connected with the data bus 12 and further has an IRQ pin which is connected with an interruption pin INT of the central processing unit 11.

The random access memory (RAM) 15 has data pins D0–D7 connected with the data bus 12 and has address pins A0–A10 connected with the address bus 13. The RAM 15 is used in storing information on the time calculated by the time clock IC 14 and the water quality PPM value determined by the water monitoring system 20 or on the service life of each filtration element.

Figure 2:
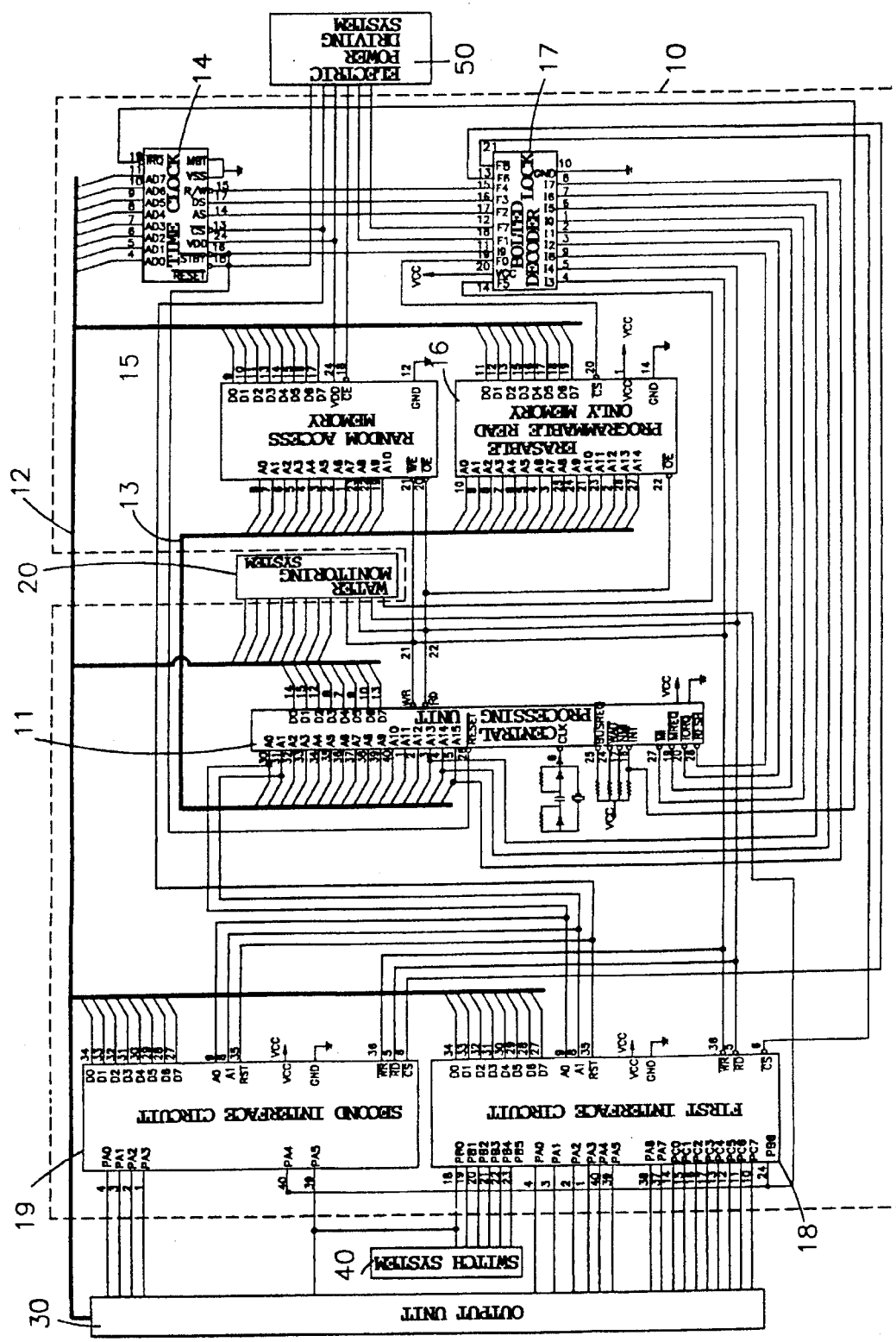
FIG. 2 shows a detailed circuit diagram of a microcomputer unit of the present invention.

Please referring to FIG. 2 and 4, the erasable programmable read only memory (EPROM) 16 has data pins D0–D7 connected with the data bus 12 and has address pins A0–A14 connected with the address bus 13. The EPROM 16 is used in storing and providing a plurality of functional service program, which are a key search program, a self-monitoring program, a wash-clean program, a water making volume computing program for determining the volume of drinking water to be made, an automatic reading program, and the information of the service life of the filtration element. On the basis of the key search program, the central processing unit 11 is responsible for the search instruction to make sure if the first and the second interface circuits 18, 19 are grounded with the pins of a plurality of keys provided in the switch system 40 (as shown in FIG. 4). If the grounding has taken place, it means that the corresponding key is pressed to switch on and the functional service program of that key is ready to be read from the EPROM 16. Each functional service program indicates the function of each corresponding key and is written as a program in the form of an interruption service program.

Please referring to FIG. 2, 3 and 4, the self-monitoring program is used by the central processing unit 11 in determining that whether the operational integrity of the entire control circuit device of the present invention has any out-of-order condition occurred, by comparing the data stored in the EPROM 16 with the data transmitted from the time clock IC 14, the RAM 15, the EPROM 16, the bolted lock decoder 17, the first interface circuit 18, the second interface circuit 19 (as shown in FIG. 2), the analog-digital converter 25 (as shown in FIG. 3), the LCD display circuit 32, and the speech circuit 33 (as shown in FIG. 4). The wash-clean program is written on the basis of technical specifications of the filtration element provided originally by the manufacturer of the filtration element, such as the service life of the filtration element, the wash-clean schedules, the volume per minute (cc/minute) of the drinking water pumped, etc.. The program for determining the volume of the drinking water to be made is written on the basis of the volume per minute (cc/minute) of the drinking water pumped for calculating the volume (cc/minute) of the drinking water pumped of each filtration element at each time and adding up progressively to provide the RAM 15 to storing the value of water making volume of each filtration element at each time. Such volume data are transmitted in a cumulative form to the central processing unit 11 in which the volume data are compared with such information as the service life of the filtration element, which is originally stored in the EPROM 16. The automatic reading program is a program written for reading one by one the information stored in the RAM 15, such as the current value of water making volume (co/minute) of each filtration element, the cumulative total value of water made, the water quality PPM value, the displayed state of the out-of-order conditions, and the operation conditions of the reverse osmosis membrane of each filtration element.

Figure 6:
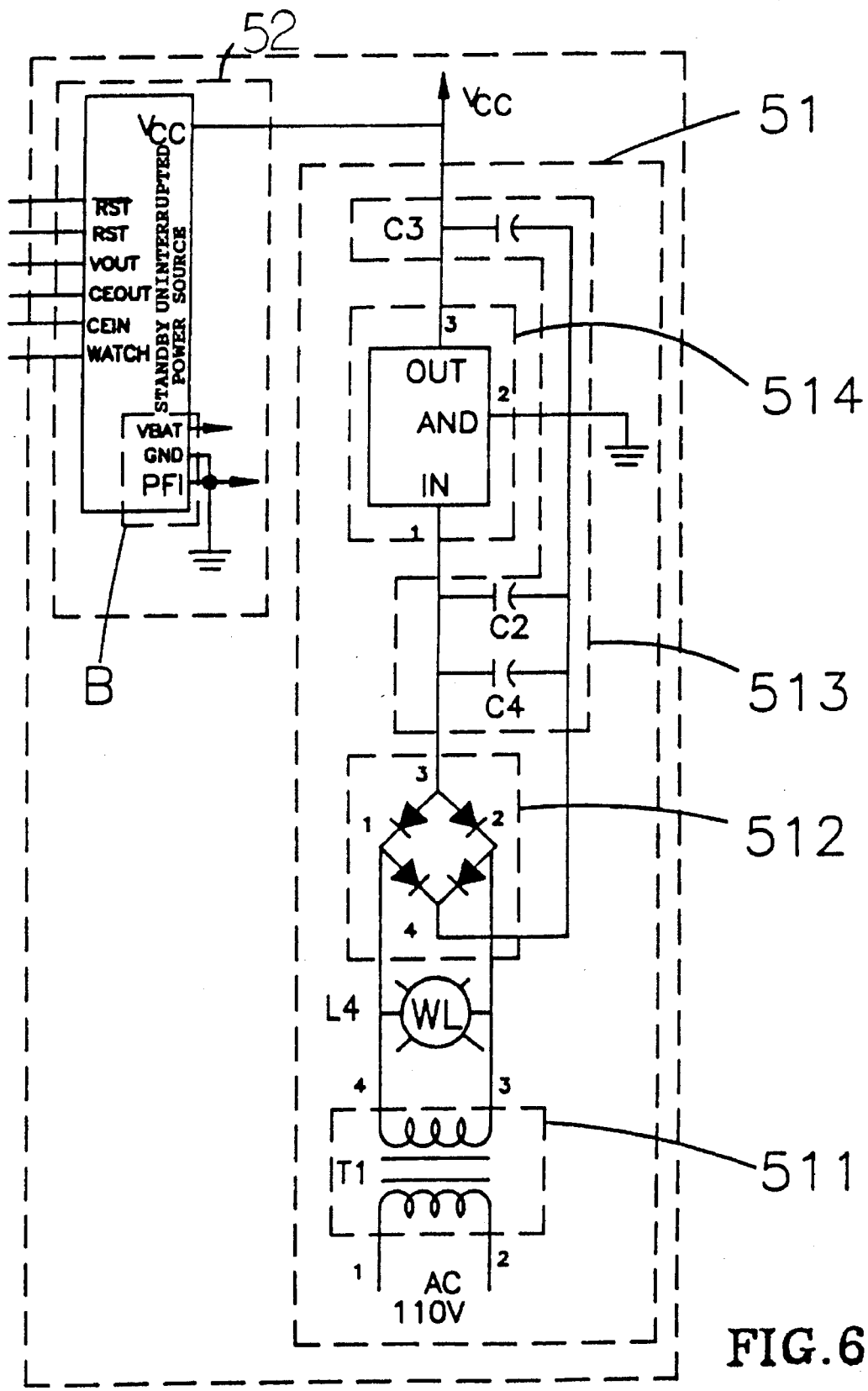
FIG. 6 shows a detailed circuit diagram of an electric power driving system of the present invention.

Please referring to FIG. 2, 3 and 6, the bolted lock decoder 17 has pins I0, I1, I2, I5, I6, I7, I8 and I9, which are connected respectively with the control pins M1, MREQ, IORQ, A13, A14, A15 and RFSH of the central processing unit 11 and the STBY or RESET pin of the time clock IC 14, as shown in FIG. 1. The output end pins F0, F1, F7, F2, F3, F4, F5, F6 and F8 of the bolted lock decoder 17 are connected respectively with the CS pin of the EPROM 16, the CEIN pin and the WATCH pin of a standby power source IC 52 of the electric power driving system 50 (as shown in FIG. 6), the AS pin, the DS pin and R/W pin of the time clock IC 14, the CS pin of the analog-digital converter 25 (as shown in FIG. 3), the CS pin of the first interface circuit 18, and the CS pin of the second interface circuit 19. The bolted lock decoder 17 is used in coding and decoding the key search program, the self-monitoring program, the wash-clean program, the water making volume computing program, and the automatic reading program, in which the programs are all stored in the EPROM 16.

Figure 5:
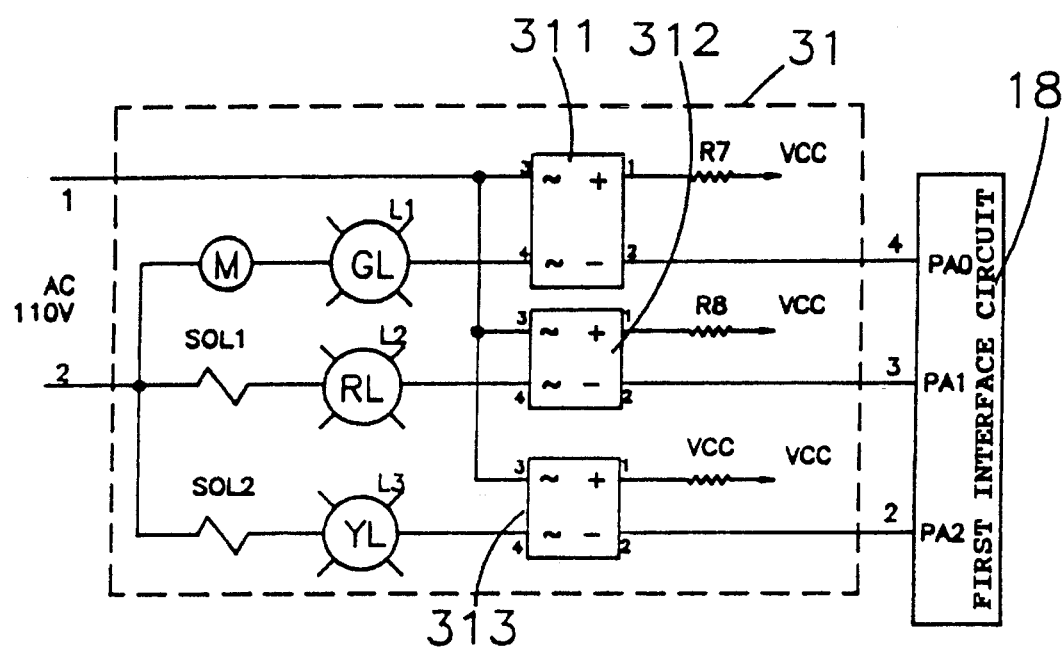
FIG. 5 shows a detailed circuit diagram of a driving circuit of the present invention.

Please referring to FIG. 2, 4 and 5, the first interface circuit 18, a parallel output and input interface, is provided with the data pins D0–D7 which are connected with the data bus 12, as shown in FIG. 2. The data pins A0 and A1 of the first interface circuit 18 are connected respectively with the A0 and A1 pins of the central processing unit 11 and the A0 and A1 pins of the second interface circuit 19. The PA0–PA2 pins of the first interface circuit 18 are connected with an output end of the driving circuit 31. The first interface circuit 18 serves as an interface for transmitting information among the driving circuit 31 (as shown in FIG. 4 and FIG. 5), the LCD displaying circuit 32, the speech circuit 33, the switch system 40 (as shown in FIG. 4) and the central processing unit 11.

Please referring to FIG. 2 and 4, the second interface circuit 19, a parallel output and input interface, is provided with the data pins D0–D7 which are connected with the data bus 12. The second interface circuit 19 serves as an interface for transmitting the information between the central processing unit 11 and the AM-FM circuit 36 (as shown in FIG. 4). The first and the second interface circuits 18 and 19 may be replaced by a plurality of parallel output and input interfaces.

As shown in FIG. 2 and 3, the water monitoring system 20 of the present invention comprises various component parts which are described hereinafter.

A water quality testing device 21 has a test input end that is disposed in a water tank S for examining the PPM value of the water, as shown in FIG. 3.

A first amplifying circuit 22 is composed of four load resistances R10, R11, R12 and R13, and a first operation amplifier 221 which has a non-opposite phase connected with the midpoint of the load resistances R10 and R11. In addition, the first operation amplifier 221 has an opposite phase end which is connected with an output end of the first operation amplifier 221 and one end of the load resistance R12 in a parallel manner. The midpoint of the load resistances R12 and R13 is connected with the non-opposite phase end of a fourth operation amplifier 26, as shown in FIG. 3.

A second operation amplifier 23 is composed of two load resistances R14, R15, and a second operation amplifier 231. The opposite phase of the second operation amplifier 231 is connected in a parallel manner with the test input end of the water quality testing device 21 and with one end of the load resistance R14. The non-opposite phase end of the second operation amplifier 231 is connected in a parallel manner with an output end of the second operation amplifier 231 and with one end of the load resistance R15. Another end of the load resistance R15 is connected with the non-opposite phase end of the fourth operation amplifier 26, as shown in FIG. 3.

A feedback amplifier circuit 24 includes two load resistances R16 and R17, a variable resistance R18 and a third operation amplifier 241. The non-opposite phase end of the third operation amplifier 241 is grounded and connected respectively with the load resistance R16 and the variable resistance R18. The output end of the third operation amplifier 241 is connected respectively with the load resistance R16 and the load resistance R17 which another end is connected with the non-opposite phase end of the fourth operation amplifier 26, as shown in FIG. 3.

The analog-digital converter 25, as shown in FIG. 3, has data pins DB0–DB7 which are connected respectively with the data bus 12, a VI pin which is connected with the output end of the fourth operation amplifier 26 and with another end of the variable resistance R18 of the feedback amplifying circuit 24, and an INTR pin which connected with the PB6 pin of the first interface circuit 18 and the PB4 pin of the second interface circuit 19. The analog-digital converter 25 is used to receive the analog signals from the fourth operation amplifier 26. The analog signals are then converted into digital signals.

As shown in FIG. 2, 4 and 5, the output unit 30 of the present invention comprises the component parts which are described hereinafter.

Please referring to FIG. 5, the driving circuit 31 comprises a first driving device 311, a second driving device 312, a third driving device 313, an operation indication light L1, a water-making indicating light L2, a wash-clean indicating light L3, a pump M, a first electromagnetic valve SOL1, and a second electromagnetic valve SOL2. The direct current ends of the first driving device 311, the second driving device 312 and the third driving device 313 are connected respectively with the pins PA0, PA1 and PA2 of the first interface circuit 18. The alternating current ends of the first driving device 311, the second driving device 312 and the third driving device 313 are connected respectively with the operation indicating light L1, the water-making indicating light L2, and the wash-clean indicating light L3, which are in turn connected respectively at another pin thereof with the pump M, the first electromagnetic valve SOL1 and the second electromagnetic valve SOL2. The driving circuit 31, connected with the PA0–PA2 of the first interface circuit 18 as mentioned above, is used in driving the pump M, the electromagnetic valve SOL1, the electromagnetic valve SOL2 and the indicating lights L1–L4, as shown in FIG. 2, 4 and 5.

Please referring to FIG. 4, the LCD displaying circuit 32 has data pins 000–007, an enabling pin -E, and a read/write pin RS, which are connected respectively with pins PC0–PC7, PA6 and PA7 of the first interface circuit 18. The LCD displaying circuit 32 is used to displaying the data of the current time, the time when the replacement of each filtration element took place, the PPM value, the current value of the water making volume, the total value of water making volume, the mechanical breakdown condition, etc., which are all stored in the RAM 15.

As shown in FIG. 4, the speech circuit 33 is connected with the pins PA3–PA5 of the first interface unit 18 and are composed of a speech synthesizing integrated IC and a speaker SP. The speech circuit 33 is used in receiving breakdown signals and providing warning signals of replacing the worn-out filtration element, which are detected by the self-monitoring program. The speech circuit 33 may be replaced by a sounding circuit 34 having a buzzing device and/or a lighting circuit 35 having a light device.

The AM/FM circuit 36, as shown in FIG. 4, has data input pins and data output pins which are connected with the data bus 12, a signal control pin which is connected with input pins PA0–PA3 of the second interface circuit 19, a speaker SP which is connected with the SP end of the AM/FM circuit 36. The AM/FM circuit 36 is used to receive the waves of the assigned frequencies of broadcasting stations, which are converted into the acoustic signals that are transmitted to the microcomputer unit 10 (as shown in FIG. 1) and then to the speech circuit 33.

As shown in FIG. 4, the switch system 40 is made up of a set of key system which comprises a key SW1 acting as a starting key, a key SW2 used in setting up the data at the time when the first filtration element is replaced, a key SW3 used in setting up the data at the time when the second filtration element is replaced, a key SW4 used in setting up the data, a key SW5 used in searching the data, a key SW6 used in actuating the water-making switch, and a manual key used in actuating the mechanism permitting a manual wash-clean operation of the filtration element. All of the keys SW1–SW6 mentioned above are connected with any one of the output/input pins of the first interface circuit 18. A key SW7 is used in starting the AM/FM circuit 36 and is connected with the switch pins provided by the AM/FM circuit 36.

As shown in FIG. 2 and 6, the electric power driving system 50 of the present invention comprises mainly a direct current power supplying device 51 and a standby uninterrupted power source IC 52.

The direct current power supplying device 51 is composed of a transformer 511, a power source indicating high L4, a bridge rectifier 512, a filtering capacitor 513, and a voltage stabilizer 514. The direct current power supplying device 51 is used in supplying the power that is required for the normal operation of the microcomputer unit 10, the water-monitoring system 20, the driving circuit 31 of the output unit 30, and the switch system 40, etc., as shown in FIG. 6.

The standby uninterrupted power source IC 52 has signal control input/output pins which are connected respectively with the RESET pin of the central processing unit 11, the STBY or RESET or VDD pin of the time clock IC 14, the VDD and the CE pins of the RAM 15, and the RST pins of the first and the second interface circuits 18 and 19. The standby uninterrupted power source IC 52 can be put into service on an emergency basis at such time when a power outage breaks out. In addition, the standby uninterrupted power source IC 52 may be provided respectively at the pins VBAT and GND with a battery B.

The operation of the present invention is described explicitly hereinafter.

Upon completion of installing the drinking water machine of the present invention, the key SW1 (COLD START-SW) is pressed to switch on. Under the control of the central processing unit 11, a corresponding function service program stored in the EPROM 16 is then read under the instruction of the key search program via the first interface circuit 18. The corresponding function service program of the key SW1 so read is a program for restarting the drinking water machine. In the meantime, the bolted lock decoder 17 begins executing the program having the program decoding function, so as to enable the entire control circuit to reach the correct address to read the data in order to enable the entire control circuit to work normally.

As the entire control circuit of the drinking water machine of the present invention works normally, the key SW4 (SET-SW) is pressed to switch on subsequently. Under the control of the central processing unit 11, a corresponding function service program stored in the EPROM 16 can be read under the instruction of the key search program via the first interface circuit 18. The function service program so read is a program instructing the time clock IC 14 to measure the time in a cumulative manner from zero up to the designated time. When a designated time and date reaches, the key SW4 is then pressed so that the pin F9 of the bolted lock decoder 17 sends out a signal to the time clock IC 14 in which the time and the date are locked in. The time and the date data are then recorded and stored in the RAM 15 via the data bus 12. In the meantime, such time and date data are displayed by transmitting to the LCD displaying circuit 32 from the data bus 12 via the pins PC0–PC7 of the first interface circuit 18.

When a maintenance worker has completed the work of replacing the first filtration element, the data, such as the time and the date upon which the replacing of the first filtration element takes place, can be set up by the key SW1 (FILTER 1 SET-SW). (In case of the second filtration element is replaced, the key SW2 is used in setting up the time and the date data.) Under the control of the central processing unit 11, a corresponding function service program stored in the EPROM 16 can be read under the instruction of the key search program via the first interface circuit 18. The corresponding function service program so read is a program instructing the bolted lock decoder 17 to lock in the time and the date data of the time clock IC 14. In the meantime, the time and the date data of the time clock IC 14 are recorded and stored in the RAM 15 via the data bus 12. Such time and date data are also displayed by transmitting from the data bus 12 to the LCD displaying circuit 32 of the output unit 30 via. the pins PC0–PC7 of the first interface circuit 18.

When the owner or user of the drinking water machine of the present invention desires to know the current status of the use of the machine, he or she must press to switch on the key SW5 (SEARCH-SW). Under the control of the central processing unit 11, a corresponding function service program stored in the EPROM 16 can be read under the instruction of the key search program via the first interface circuit 18. The corresponding function service program so read is a program enabling an access to the various use data of the machine, which are in the RAM 15. Such data include the date upon which the machine was installed, the current time, the dates upon which the filtration elements were replaced, the PPM value, the current value of drinking water making volume, the total value of drinking water making volume, etc.. Such data are also displayed by transmitting from the data bus 12 to the LCD displaying circuit 32 of the output unit 30 via the pins PC0–PC7 of the first interface circuit 18.

The present invention may provide at the pin PB7 of the first interface circuit 18 with a manual key. The user of the drinking water machine may have to clean the machine manually at such time when the automatic cleaning device is out of order. By pressing the manual key and under the control of the central processing unit 11, a corresponding function service program stored in the EPROM 16 can be read under the instruction of the corresponding search program via the first interface 18. The function service program so read is a program instructing the pins PA0 and PA2 of the first interface circuit 18 to dispatch respectively a signal to the first driving device 311 and the third driving device 313 so as to actuate the pump M and the second electromagnetic valve SOL2. As a result, both the operation indicating light L1 and the wash-clean indicating light L3 light up.

If the level of the drinking water in the drinking water machine of the present invention is under the standard value, the key SW6 is actuated to close. Under the control of the central processing unit 11, a corresponding function service program stored in the EPROM 16 is read under the instruction of the key search program via the first interface circuit 18. The corresponding function service program so read is a program instructing the pins PA0 and PA1 of the first interface circuit 18 to dispatch respectively a signal to the first driving device 311 and the second driving device 312 so as to actuate the pump M and the first electromagnetic valve SOL1. As a result, the operation indicating light L1 and drinking water indicating light L2 both light up.

The drinking water machine of the present invention is provided with an automatic displaying function. The central processing unit 11 is instructed at an interval by the automatic reading program to read the current data stored in the RAM 15. The current data, such as the current value of the drinking water making volume, the PPM value of the water quality and the displaying status of the out-of-order condition, are displayed via the LCD displaying circuit 32 of the output unit 30.

The central processing unit 11 of the drinking water machine of the present invention is capable of testing automatically to find out if there is any out-of-order condition happened in the entire control circuit when the automatic displaying process is in progress. The out-of-order condition of the entire control circuit will be located and displayed via the LCD displaying circuit 32 of the output unit 30. In addition, the maintenance worker is reminded of the trouble spot in the control circuit by a warning signal in the form of sound or light via the speech circuit 33.

The drinking water machine of the present invention may be used as an AM/FM radio by switching on the key SW7 (as shown in FIG. 4). Under the control of the central processing unit 11, the AM/FM circuit 36 is actuated via the second interface circuit 19. In the meantime, the automatic displaying function of the drinking water machine is interrupted for the time being. The user of the drinking water machine of the present invention may listen to the AM/FM radio while the drinking water machine is in use. When the water making key SW6 is actuated to close, a signal is sent to the AM/FM circuit 36. Under the control of the central processing unit 11, the displaying status and the speech function of the AM/FM circuit 36 are interrupted immediately. In the meantime, the automatic displaying function of the drinking water machine is resumed. After a while, the displaying status and the speech function of the AM/FM circuit 36 are resumed.

The electric power driving system 50 of the drinking water machine of the present invention is provided additionally with a standby uninterrupted power source IC 52 which is ready to be put into service on an emergency basis. The standby uninterrupted power source IC 52 can be activated before the voltage of the regular power source drops to a specified value. As a result, The output of the standby power source is sent to the time clock IC 14 and the RAM 15 via the pin VOUT so as to prevent the work stoppage of the time clock IC 14 and the possible loss of important data, such as the date on which the filtration element was replaced, the current value of the water making volume of the water monitoring system 20, and the PPM value, etc..

The advantages inherent in the present invention are described hereinafter.

The present invention is provided with means capable of monitoring the quality of the drinking water automatically. Under the control of the central processing unit 11, the PPM value of the drinking water is provided by the water quality testing device 21 via the fourth operation amplifier 26. The PPM value is then transmitted to the first interface circuit 18 via the data bus 12. Thereafter, a signal is sent via the pins PC0–PC7 of the first interface circuit 18 to the LCD displaying circuit 32 of the output unit 30. As a result, the user of the drinking water machine of the present invention is able to determine the quality of the drinking water on the basis of the displayed PPM value.

The present invention is provided with means capable of cleaning the RO filtration elements automatically. As the PPM value shown by the water monitoring system 20 remains within a specific range, the central processing unit 11 computes the current service life that is the current value of water making volume of each of the RO filtration elements on the basis of the time set up by the wash-clean program stored in the EPROM 16. If the calculated current service life approximates the service life stored in the RAM 15, the pins PA0–PA2 of the first interface circuit 18 dispatch respectively a wash-clean signal to the first driving device 311 and the third driving device 313 to actuate the pump M and the second electromagnetic valve SOL2 in order to wash and clean the RO filtration elements automatically.

The present invention is provided with means capable of giving an advance warning before the replacing of the filtration element is called for. Under the control of the central processing unit 11, the current service life of each of the RO filtration elements is computed on the basis of the water-making volume computing program. The computed values are cumulated in accordance with a cumulative program. If the cumulated current service life of the filtration element approximates the service life storedin the RAM 15, the central processing unit 11 sends out at intervals a signal to the LCD displaying circuit 32 of the output unit 30 via the first interface circuit 18. Such a signal is displayed in the form of sound or light to remind the user of the exact time when the filtration elements must be replaced.

The present invention is provided with means capable of shutting off automatically the process of making the drinking water at such time when the PPM value detected by the water quality testing device 21 is shown to be such that the drinking water so made is not safe for human consumption. Under the control of the central processing unit 11, the first driving circuit 31. However, the displayed warning signal reminding the user of the worn-out filtration elements remains in operation until such time when the worn-out filtration elements are replaced. The displayed warning signal will disappear as soon as the keys SW1 and SW2 are pressed to switch on.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of following appended claims.

I claim:

1. An intelligent and all-bearing control circuit device of a reverse osmosis drinking water machine which filters water by means of a plurality of filtration elements, comprising a microcomputer unit, a water monitoring system, an output unit, a switch system, and an electric power driving system, wherein:

said microcomputer unit having an output end and an input end for processing signals transmitted thereto;

said water monitoring system having an output end connected with said output end of said microcomputer unit and sending out signals to said microcomputer unit via said output end of said water monitoring system to said input end of said microcomputer unit, for measuring water quality signal; said water monitoring system comprising an analog-digital converter;

said switch system having an output end connected with said input end of said microcomputer unit for data searching and data setting up, said switch system comprising a SW1 starting key, a SW2 key for setting up the data at the time when the first filtration element replaced, a SW3 key for setting up the data at the time when the second filtration element replaced, a SW4 key for setting up data, a SW5 key for searching data, and a SW6 key for alternating a water-making switch;

said output unit, which comprises a driving circuit, an LCD displaying circuit and a speech circuit, having an input end connected with said output end of said microcomputer unit, for displaying instructions sent by said microcomputer unit in which the signals from said water monitoring system and said switch system are processed, whereto said speech circuit is used in receiving breakdown signals and providing warning signals of replacing the worn-out filtration element;

said electric power driving system, which is a source of operating power for driving said microcomputer unit, said water monitoring system, said output unit, and said switch system, having a direct current power supplying device for supplying the power that is required for the normal operation of said microcomputer unit, said water-monitoring system, said driving circuit of said output unit, and said switch system; said electric power driving system further comprising a standby power source IC which can be put into service on an emergency basis at such time when a power outage breaks out;

said microcomputer unit comprising a central processing unit, a time clock IC, a random access memory, an erasable programmable read only memory, a bolted lock decoder, a first interface circuit, a second interface circuit, a data bus, and an address bus; in which said data bus and address bus are conductors for common connection;

said central processing unit having data pins D0, D1, D2, D3, D4, D5, D6 and D7 connected with said data bus; address pins A0, A1, A2, A3, A4, A5, A6, A7, A8, A9, A10, A11, A12, A13, A14 and A15 connected with said address bus; data reading pins RD connected respectively with an OE pin of said random access memory, an OE pin of said erasable programmable read only memory, an I4 pin of said bolted lock decoder, a RD pin of said first interface circuit, a RD pin of said second interface circuit, and a RD pin of said analog-digital converter of said water monitoring system; data writing pins WR connected respectively with a WE pin of said random access memory, an I3 pin of said bolted lock decoder, a WR pin of said first interface circuit, a WR pin of said second interface circuit, a WR pin of said analog-digital converter, for controlling the access of data such as the PPM value and the current value of the volume of drinking water made and the service life of said filtration elements;

said time clock having address and data pins AD0, AD1, AD2, AD3, AD4, AD5, AD6 and AD7 connected with said data bus and an IRQ pin connected with an interruption pin INT of said central processing unit;

said random access memory having data pins D0, D1, D2, D3, D4, D5, D6 and D7 connected with said data bus and address pins A0, A1, A2, A3, A4, A5, A6, A7, A8, A9 and A10 connected with said address bus, for storing information of the time computed by said time clock IC, the parts per million (PPM) value of drinking water which is detected by said water monitoring system, and said current status of service life of each of said filtration elements;

said erasable programmable read only memory having data pins D0, D1, D2, D3, D4, D5, D6 and D7 connected with said data bus and address pins A0, A1, A2, A3, A4, A5, A6, A7, A8, A9, A10, A11, A12, A13 and A14 connected with said address bus, for storing therein a service life information of each of said filtration elements; said central processing unit being responsible for search instruction to make sure if said first and second interface circuits are grounded with the pins of said SW1, SW2, SW3, SW4, SW5, and SW6 keys of said switch system;

said bolted lock decoder having pins I0, I1, I2, I5, I6, I7, I8 and I9 connected respectively with control pins M1, MREQ, IORQ, A13, A14, A15 and RFSH of said central processing unit and a STBY pm and a RESET pin of said time clock IC; said bolted lock decoder further providing a plurality of output end pins F0, F1, F7, F2, F3, F4, F5, F6 and F8 connected respectively with a CD pin of said erasable programmable read only memory, a CEIN and a WATCH pins of said standby power source IC of said electric power driving system, an AS pin, a DC pin and a D/W pin of said time clock IC, a CS pin of said first interface circuit, and a CS pin of said second interface circuit;

said first interface circuit, which is an interface for transmitting data information among said driving circuit, said LCD displaying circuit, said speech circuit, and said switch system, having data pins D0, D1, D2, D3, D4, D5, D6 and D7 connected with said data bus, and data pins A0 and A1 connected respectively with an A0 pin and an A1 pin of said central processing unit and an A0 pin and an A1 pin of said second interface circuit; said first interface circuit further having pins PA0, PA1 and PA2 connected with an output end of said driving circuit; and said second interface circuit, which is an interface for transmitting data information, having data pins D0, D1, D2, D3, D4, D5, D6 and D7 connected with said data bus.

2. An intelligent and all-bearing control circuit device of a RO drinking water machine as recited in claim 1 in which said monitoring system further comprises:

a water quality testing device having a test input end that is disposed in a water tank for examining the PPM value of the drinking water therein;

a first amplifying circuit comprising a R10 load resistance, a R11 load resistance, a R12 load resistance, a R13 load resistance and a first operation amplifier which has a nonopposite phase connected with the midpoint of said R10 and R11 load resistances; said first operation amplifier having an opposite phase end which is connected with an output end of said first operation amplifier and one end of said R12 load resistance in a parallel manner; the midpoint of said R12 and R13 load resistances connecting with a nonopposite phase end of a fourth operation amplifier;

a second operation amplifier comprising a R14 load resistance, a R15 load resistance and a second operation amplifier which has an opposite phase connected in a parallel manner with said test input end of said water quality testing device and with one end of said R14 load resistance; said second operation amplifier having a nonopposite phase end connected in a parallel manner with an output end of said second operation amplifier and with one end of said R15 load resistance which another end connected with a nonopposite phase end of said fourth operation amplifier; and a feedback amplifier circuit comprising a R16 load resistance, a R17 load resistance, a R18 variable resistance, and a third operation amplifier which has a nonopposite phase end grounded and corrected respectively with said R16 load resistance and said R18 variable resistance; said third operation amplifier has an output end connected respectively with said R16 load resistance and said R17 load resistance whose another end connected with a nonopposite phase end of said fourth operation amplifier.

3. An intelligent and all-bearing control circuit device of a RO drinking water machine as recited in claim 2, in which said analog-digital converter of said water monitoring system has data pins DB0, DB1, DB2, DB3, DB4, DB5, DB6 and DB7 connected respectively with said data bus, a VI pin which is connected with an output end of said fourth operation amplifier and with another end of said R18 variable resistance of said feedback amplifier circuit, and an INTR pin which is connected with a PB6 pin of said first interface circuit and a PB4 pin of said second interface circuit, for receiving analog signals from said fourth operation amplifier and converting into digital signals.

4. An intelligent and all-bearing control circuit device of a RO drinking water machine as recited in claim 1, in which said direct current power supplying device of said electric power driving system comprises a transformer connected with a power source indicating light which is connected with a bridge rectifier, said bridge rectifier connecting with a filtering capacitor which is connected with a voltage stabilizer.

5. An intelligent and all-bearing control circuit device of a RO drinking water machine as recited in claim 4, in which said standby uninterrupted power source IC of said electric power driving system has signal control input/output pins which are connected respectively with a RESET pin of said central processing unit, a STBY or a RESET or a VDD pin of said time clock IC, a VDD and a CE pins of said random access memory, a RST pin of said first interface circuit, and a RST pin of said second interface circuit.

6. An intelligent and all-bearing control circuit device of a RO drinking water machine as recited in claim 5, in which standby uninterrupted power source having a VBAT pin and a GND pin, which are provided respectively with a battery as a safeguard against the failure of said standby uninterrupted power source.

7. An intelligent and all-bearing control circuit device of a RO drinking water machine as recited in claim 1 in which said driving circuit of said output unit connected with output pins of said first interface circuit for driving an operation indication light, a water-making indication light, a wash-clean indication light, a pump, a first electromagnetic valve, and a second electromagnetic valve;

said LCD displaying circuit of said output unit having data pins 001, 002, 003, 004, 005, 006 and 007, an enable pin, a read/write pin, which are connected with a PC0, a PC1, a PC2, a PC3, a PC4, a PC5, a PC6 a PC7, a PA6, and a PA7 data output pins of said first interface circuit, said LCD displaying circuit serving to display data stored in said random access memory, such as the PPM value, the current value of said water making volume, the total value of water making volume, and the out-of-order conditions; and said speech circuit of said output unit connecting with a PA3, a PA4 and a PA5 output pins of said first interface circuit and comprising a speech synthesizing integrated IC and a speaker SP.

8. An intelligent and all-bearing control circuit device of a RO drinking water machine as recited in claim 7 in which said driving circuit of said output unit further comprises a first driving device, a second driving device, a third driving device; said first driving device, said second driving device and said third driving device each having a direct current end connected respectively with a PA0 pin, a PA1 pin and a PA2 pin of said first interface circuit; said first driving device, said second driving device, and said third drinking device each having an alternating current end connected respectively with said operation indicating light, said water-making indicating light, and said wash-clean indicating light, which are in turn connected respectively at another pin thereof with said pump, said first electromagnetic valve and said second electromagnetic valve.

9. An intelligent and all-bearing control circuit device of a RO drinking water machine as recited in claim 7 in which said output unit further comprises an AM/FM circuit for receiving boardcasting waves of assigned frequencies which are then converted into acoustic signals that are transmitted to said microcomputer unit then to said speech circuit; said AM/FM circuit having a plurality data input pins and data output pins which are connected with said data bus, a plurality of signal control pins connected with a PA0, a PA1, a PA2, and a PA3 input pins of said second interface circuit; said AM/FM circuit further having a SP end for connecting speaker.

10. An intelligent and all-bearing control circuit device of a RO drinking water machine as recited in claim 9, in which said switch system further comprises a SW7 key connected with a switch pin provided by said AM/FM circuit for starting said AM/FM circuit.

* * * * *